(12) United States Patent
Yang et al.

(10) Patent No.: US 9,288,633 B2
(45) Date of Patent: Mar. 15, 2016

(54) SYSTEMS AND METHODS FOR REVISIT LOCATION DETECTION

(71) Applicant: INTEL CORPORATION, Santa Clara, CA (US)

(72) Inventors: Xue Yang, Arcadia, CA (US); Lei Yang, Hillsboro, OR (US); Aveek Purohit, Moffett Field, CA (US)

(73) Assignee: INTEL CORPORATION, Santa Clara, CA (US)

( * ) Notice: Subject to any disclaimer, the term of this patent is extended or adjusted under 35 U.S.C. 154(b) by 10 days.

(21) Appl. No.: 14/126,096

(22) PCT Filed: Jun. 28, 2013

(86) PCT No.: PCT/US2013/048498
§ 371 (c)(1),
(2) Date: Dec. 13, 2013

(87) PCT Pub. No.: WO2014/209344
PCT Pub. Date: Dec. 31, 2014

(65) Prior Publication Data
US 2015/0172869 A1    Jun. 18, 2015

(51) Int. Cl.
*H04W 4/04* (2009.01)
*H04W 64/00* (2009.01)
*H04W 4/02* (2009.01)

(52) U.S. Cl.
CPC .............. *H04W 4/04* (2013.01); *H04W 4/028* (2013.01); *H04W 64/00* (2013.01); *H04W 4/02* (2013.01)

(58) Field of Classification Search
CPC ....... H04W 4/02; H04W 4/023; H04W 4/028; H04W 4/04
USPC ...................................................... 455/456.1
See application file for complete search history.

(56) References Cited

U.S. PATENT DOCUMENTS

2010/0105409 A1* 4/2010 Agarwal et al. ............ 455/456.1
2010/0285816 A1  11/2010 Vos et al.
2012/0313777 A1* 12/2012 Zazula ...................... 340/539.13
2013/0244692 A1*  9/2013 Kelly et al. ................. 455/456.1

OTHER PUBLICATIONS

International Search Report and Written Opinion received for PCT Patent Application No. PCT/US2013/048498, mailed on Feb. 26, 2014, 13 pages.
Granstrom, et al., "Learning to Detect Loop Closure from Range Data", IEEE International Conference on Robotics and Automation, Kobe International Conference Center, Japan, May 12-17, 2009, pp. 15-22.
Newman et al., "Outdoor SLAM using Visual Appearance and Laser Ranging" IEEE International Conference on Robotics and Automation, Orlando, FL, USA, May 15-19, 2006, 8 pages.
Shin, et al., "Wi-Fi Fingerprint-Based Topological Map Building for Indoor User Tracking", IEEE 16th International Conference on Embedded and Real-Time Computing Systems and Applications, Macau SAR, Aug. 23-25, 2010, 9 pages.
Callmer, et al., "Tree of Words for Visual Loop Closure Detection in Urban SLAM", Australaian Conference on Robotics and Automation, Canberra, Australia, Dec. 3-5, 2008, 8 pages.

* cited by examiner

Primary Examiner — Barry Taylor
(74) Attorney, Agent, or Firm — Salehi Law Group (57) ABSTRACT

A method of detecting a revisit position includes receiving at a computing system a plurality of position data points, each of the plurality of position data points including a signal scan measurement. The method farther includes calculating a first signal distance between a first signal scan measurement corresponding to a first position data point of the plurality of position data points and a second signal scan measurement corresponding to a second position data point of the plurality of position data points. The method further includes determining that the first signal distance is less than a first threshold, that the first signal distance is a local minimum for the first position data point, and the first signal distance is a local minimum for the second position data point. The method further includes, based on the determining, identifying the first and second position data points as revisit points.

25 Claims, 6 Drawing Sheets

SYSTEMS AND METHODS FOR REVISIT LOCATION DETECTION

TECHNICAL FIELD

Embodiments described herein generally relate to alignment of detected paths of travel and revisit location detection.

BACKGROUND

Deriving accurate indoor location has been an increasingly important topic in the midst of mobile applications blooming. Despite a decade of research and development efforts, enabling indoor location capability remains a challenging topic. GPS positioning is generally not available indoors due to poor reception of signals. Therefore, an alternative system is needed for determining mobile device position.

DETAILED DESCRIPTION OF THE DRAWINGS

Described herein are embodiments of systems and methods for Revisit Location Detection. Essentially, wireless signal information is used to determine the differences in signal, including, in many cases, an RSSI vector. When two points have very little difference in the signal detected, it may be determined that the two points identified are the same point. In order to filter out false positives, additional layers of screening are included. These layers include determining that the points sharing the low difference in signal detected are both local minimums considering closely adjacent points. Another layer of screening may include ensuring that the measurements occurred a significant period of time apart when the user is repeatedly walking a path.

WiFi-based indoor location technologies have attracted a lot of attention in they past decade given the wide deployment of WLAN infrastructure. There are two major industry efforts that determine locations based on WiFi signal strength. One camp—such as "SkyHook" or GoogleMap—utilizes tritateralization based on a radio propagation model to estimate mobile client distance from the known locations of Access Points and the transmission power. The second camp—such as Ekahau or Qubulus—relies on storing pre-recorded calibration WiFi measurement data ("WiFi fingerprint") so that the locations can be determined through "WiFi fingerprint" matching.

In particular, using pre-stored WiFi fingerprints for indoor location can provide more accurate indoor location. However, it requires generating a pre-calibrated WiFi fingerprint database by sampling the radio signal strength from multiple APs (Access Points) at dense locations, then deriving the location through fingerprint matching at fine location granularity. The common practice at the present time is to have people manually calibrate a radio map at the dense grid level. There are industry efforts moving towards reducing the manual labor. However, state-of-the-art technologies still require substantially manual input front users, leading to high deployment cost to generate a high-quality WiFi fingerprint database.

To reduce the deployment effort of "WiFi fingerprinting" while maintaining good location accuracy, a Simultaneous Localization and Mapping (SLAM) approach may be used to integrate the inertial Navigation System (INS) with WiFi, with the objective to automatically build a "WiFi fingerprint map" at fine granularity without human intervention.

Figure 1:
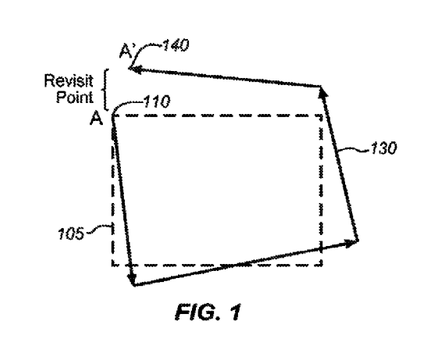
FIG. 1 shows an example of a revisit trajectory and map.

One of the key problems addressed by the systems and methods for Revisit Location Detection is to identify "revisit" points, the ability to detect when a user is revisiting a particular location that has been visited before. For example, a user moves along the rectangle trajectory indicated by the dash line 105 shown in FIG. 1, starting from point A 110 and ending at the same point A 110. However, the predicted trajectory 130 from INS (inertial Navigation Sensors) departs from the true trajectory 105 due to growing errors of inertial sensor measurements, as illustrated by the solid line 130—the predicted trajectory ends at point A' 140 despite that the true trajectory ends at point A 110, if the "revisit" of point A 110 can be properly detected, then SLAM optimization can apply the "revisit" hint to largely improve the predicted trajectory.

Traditional SLAM schemes detect "loop closing" mostly based on visual sensors and/or laser range sensors, which provide the perception of the physical environment and have rich features to identify the "revisited" locations. For consumer mobile device based indoor localization, however, laser range sensor is not, available and a visual sensor requires too much processing power. Without visual or laser range sensors, WIFi radio may be used as one source of measurements associated with the physical environment.

It is not clear that simple schemes may be used to accurately detect "revisit" using WiFi radio signals observed in the indoor environment. It is a particularly challenging problem given the unstable nature of WiFi signals. A simple WiFi distance threshold based "revisit" detection used in many existing publications leads to less than 50% detection accuracy. It should be noted that "revisit" accuracy is important for the convergence of SLAM optimization. Incorrectly identified "revisits" can be harmful for SLAM performance.

In response, several techniques are provided in this application that substantially improve "revisit" detection accuracy to over 90% using WiFi measurements.

Figure 2:
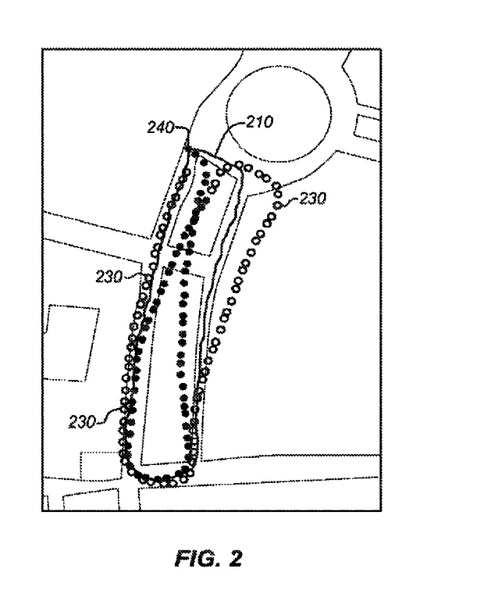
FIG. 2 shows another embodiment of a system for Selective Scanning Based on Movement.

Consider the example in FIG. 2. A user walks around in a shopping mall carrying his/her mobile device along the trajectory 110. Each dot 230, 240 in FIG. 2 indicates an estimated position (from inertial sensor dead reckoning) where a WiFi scan is made. The open dots 230 represent estimated scanning positions when the user walks along the trajectory for the first time. The closed dots 240 represent estimated scanning positions when the user walks along the trajectory (or path) for the second time. Due to various reasons, the estimated scanning positions from inertial sensor dead reckoning are error-prone and need to be corrected. One of the important issues is how to recognize the corresponding revisit positions using WiFi scan measurements collected during the walking.

In contrast to simple threshold based methods, more complete and less error prone techniques are provided. The WiFi signal distance is calculated (e.g., Euclidean distance of WiFi measurement vectors where each WiFi measurement vector consists of WiFi RSSI from multiple APs). If the WiFi distance between two measurement points is less than a threshold, then those two points are considered as revisit points. Due to the large variations of a WiFi signal itself, this naïve approach often leads to poor "revisit" detection (less than 50% detection accuracy), which can be very harmful for SLAM convergence performance.

Specifically, the following procedure is provided to identify whether two points, say "i" and "j," are revisit points or not. Here, total N WiFi scans are collected during a user's walking, and i, j are the scanning index (i, j=1, 2, ... N). The estimated positions where the $i_{th}, j_{th}$, WiFi scans are made are given as $POS_i$ and $POS_j$.

1. Normalized WiFi distance (instead of absolute WiFi distance) between points "i" and "j" is calculated using the WiFi measurements collected at points "i" and "j." More specifically, let $V_1$ be the WiFi RSSI vector at point "i" and be the WiFi RSSI vector at point "j"; and let K be the number of common APs in $V_2$ and $V_j$ (note that different sets of APs may be observed at points "i" and "j" due to their spatial difference). The normalized WiFi distance is calculated as:

$$D_j^i = \frac{\|V_i - V_j\|}{Pow\left(K \cdot \frac{1}{p}\right)}$$

where ||, || can be any norm function. If $D_j^i$ is less than a threshold WiFi_Thresh, then proceed to 2. Otherwise, "i" and "j" are not revisit points.

Figure 3:
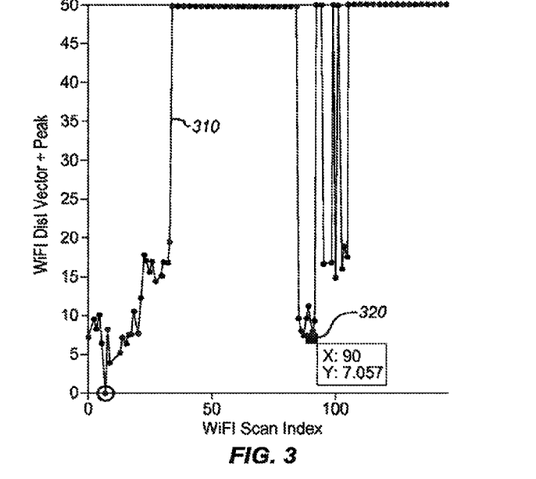
FIG. 3 shows an example of normalized WiFi Distance between the 7th WiFi scan with other WiFi scans.

2. Consider the normalized WiFi distance between the neighboring points of and Only if $D_j^i$ is a local minimum at point "j," we proceed to 3. In other words, only if there exists some $\epsilon>0$ such that $D_j^{i'}>D_j^i$ when $|j-j'|<\epsilon$, we proceed to 3. Otherwise, "i" and "j" are not revisit points. For example, in FIG. 3, the curve plots 310 represent the WiFi distance between the 7th WiFi scan (i=7 in this example) and all other WiFi scans collected during the user's walking, where the X axis is the. WiFi scan index and the Y axis is the corresponding normalized WiFi distance. The WiFi distance between the 7th and the 90th WiFi scan is a local minimum 320 for the 7th scan.

Figure 4:
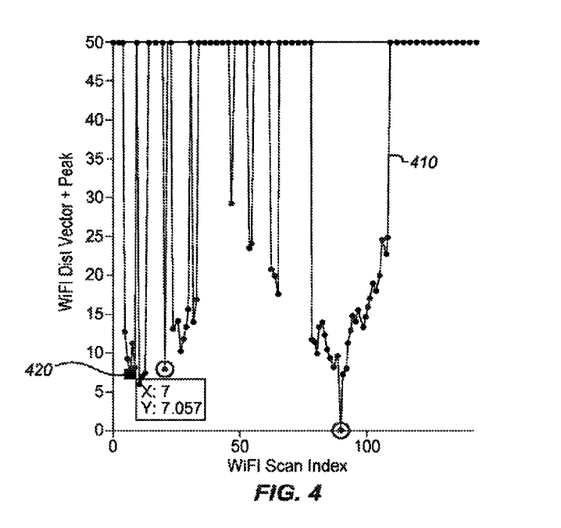
FIG. 4 shows an example of normalized WiFi Distance between the 90th WiFi scan with all other WiFi scans.

3. Consider the normalized WiFi distance between "i's" neighboring points and "j." Only if $D_j^i$ is a local minimum at point "i," proceed to 4. That is, only if there exists some $\epsilon>0$ such that $D_j^{i'}>D_j^i$ when $|t-i^{th}|<\epsilon$, we proceed to 4. Otherwise, "i" and "j" are not revisit points. Continuing the above example, in FIG. 4, the curve plots 410 represent the normalized WiFi distance between the 90th WiFi scan and other WiFi scans, where the X axis is the WiFi scan index and the Y axis is the corresponding normalized WiFi distance. The WiFi distance between the 7th and the 90th WiFi scans is also a local minimum 420 for the 90th WiFi scan.

4. Let the time for the $i_{th}$ scan be $T_i$ and the time for jth scan be $T_j$. If time elapsed between $T_i$ and $T_j$ is greater than a threshold (time_thresh), then proceed to 5. Otherwise, "i" and "j" are not revisit points. This is to avoid neighboring WiFi scans being categorized as revisit points, since they tend to be similar to each other.

5. At this point, "i" and "j" may be committed as revisit points to each other.

Figure 5:
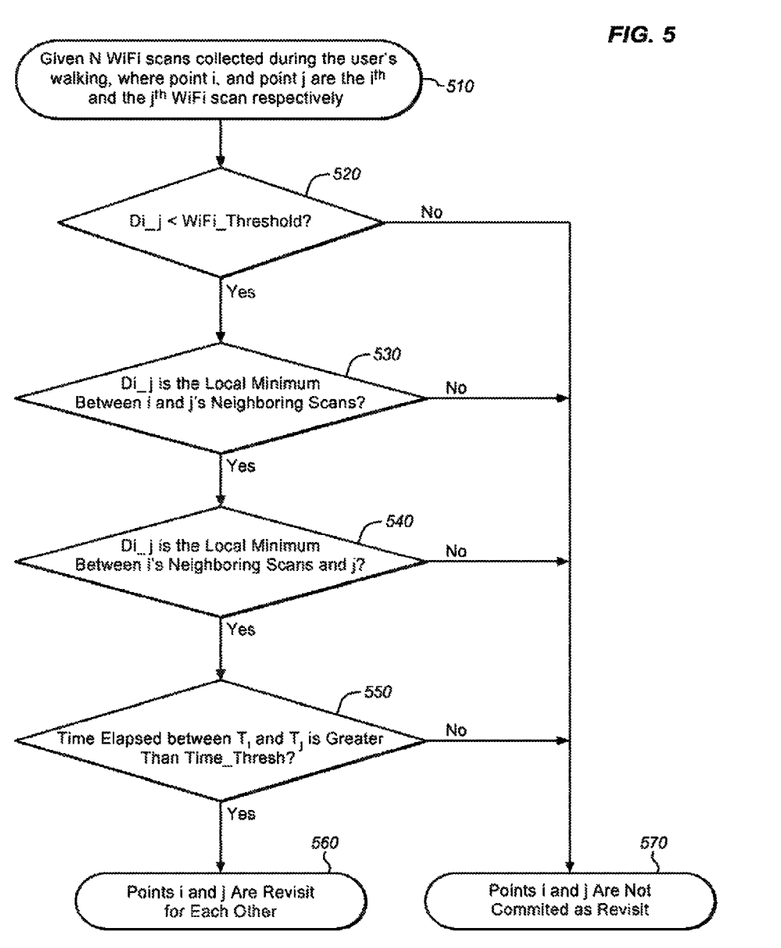
FIG. 5 shows one embodiment of a method for Revisit Point Detection.

A functional diagram of one embodiment of the method is shown in FIG. 5. In block 510, a plurality of WiFi scans collected during a user's traverse of a route carrying a portable electronic device such as a mobile phone are provided to a computing system, such as a remote server. Alternative computing systems may be used including, but not limited to, the mobile device itself, a laptop or other computer, other remote servers, cloud computing systems, etc. In block 520, it is determined whether a particular WiFi distance is less than a threshold. If not, the points are not revisit points, if the WiFi distance is less than the threshold, it is determined in block 530 whether the WiFi distance is a local minimum between the point related to the first measurement and points adjacent to the second measurement. If it is, then it is determined in block 540 whether the WiFi distance is a local minimum between the point related to the second measurement and points adjacent to the first measurement. If it is, then it is determined in block 550 whether the elapsed time between the two points is greater than a threshold. If it is, then in block 560, the points are determined to be revisit points. Otherwise, the points are determined not to he revisit points in block 570.

Figure 6A:
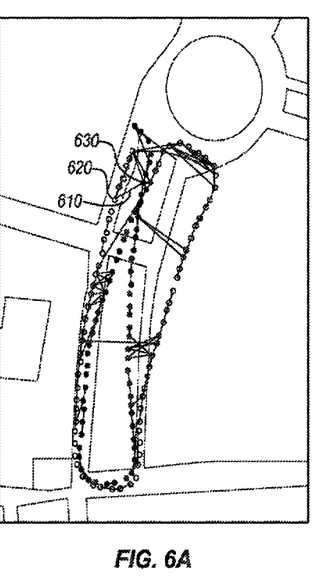
FIG. 6a shows an example of revisit points identified using a simple threshold based method.
Figure 6B:
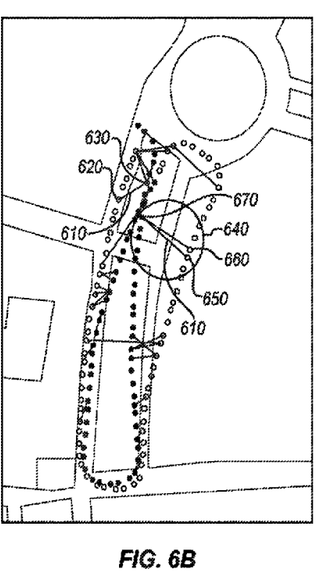
FIG. 6b shows an example of revisit point detection using threshold and local minimum methods.
Figure 6C:
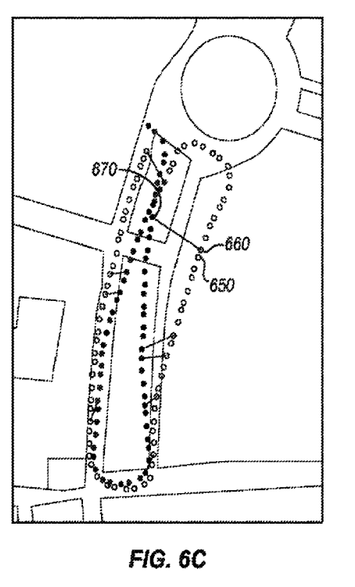
FIG. 6c shows an example of revisit point detection using the method provided in FIG. 5.

FIG. 6a shows revisit points identified using a simple threshold based method. FIG. 6b shows revisit points identified using procedures 1 and 2 only. FIG. 6c shows revisit points identified using proposed method (procedures 1, 2, 3, 4, 5).

FIG. 6a illustrates the revisits identified using a simple threshold based method (existing methods), where two revisit points 620, 630 are connected using a line 610. As we can see, many revisit points identified are wrong. The detection accuracy is less than 50%.

FIG. 6b illustrates the revisits identified using only procedures 1 and 2 of the proposed method (the usage of a threshold and the determination that the WiFi distance is a local minimum for one of the points).

As we can see, many incorrect revisit points are filtered out compared with FIG. 6a. However, neighboring points often can have the same revisit, as the circle 640 in FIG. 6b highlights, which can also harm the SLAM convergence performance. Here, points 650, 660 are identified as both having the same revisit point 670 (i.e., 670 is a local minimum for both 650 and 660).

FIG. 6c illustrates the revisits identified using the complete method of FIG. 5. As we can see, essentially all incorrect revisit points in this particular example have been removed compared with FIGS. 6a and 6b.

Figure 7A:
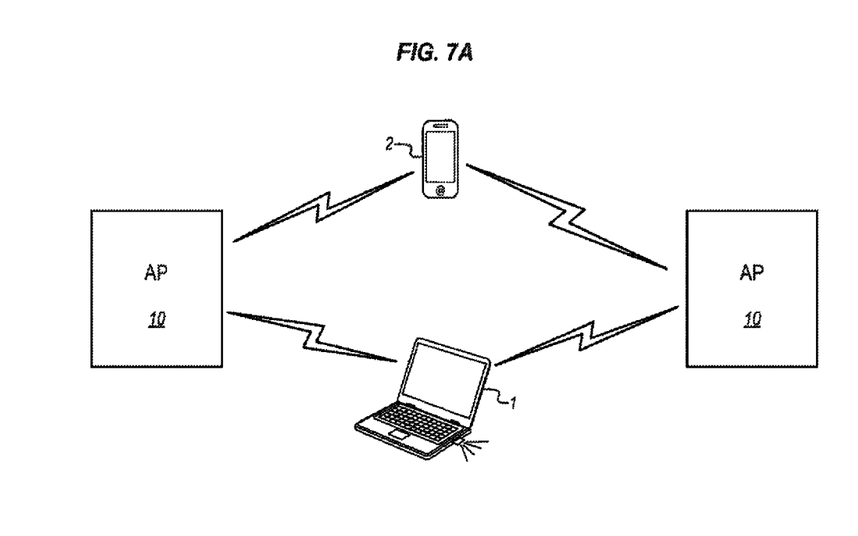
FIG. 7a shows an example of an environment in which embodiments of systems and methods for Revisit Location Detection may be implemented.
Figure 7B:
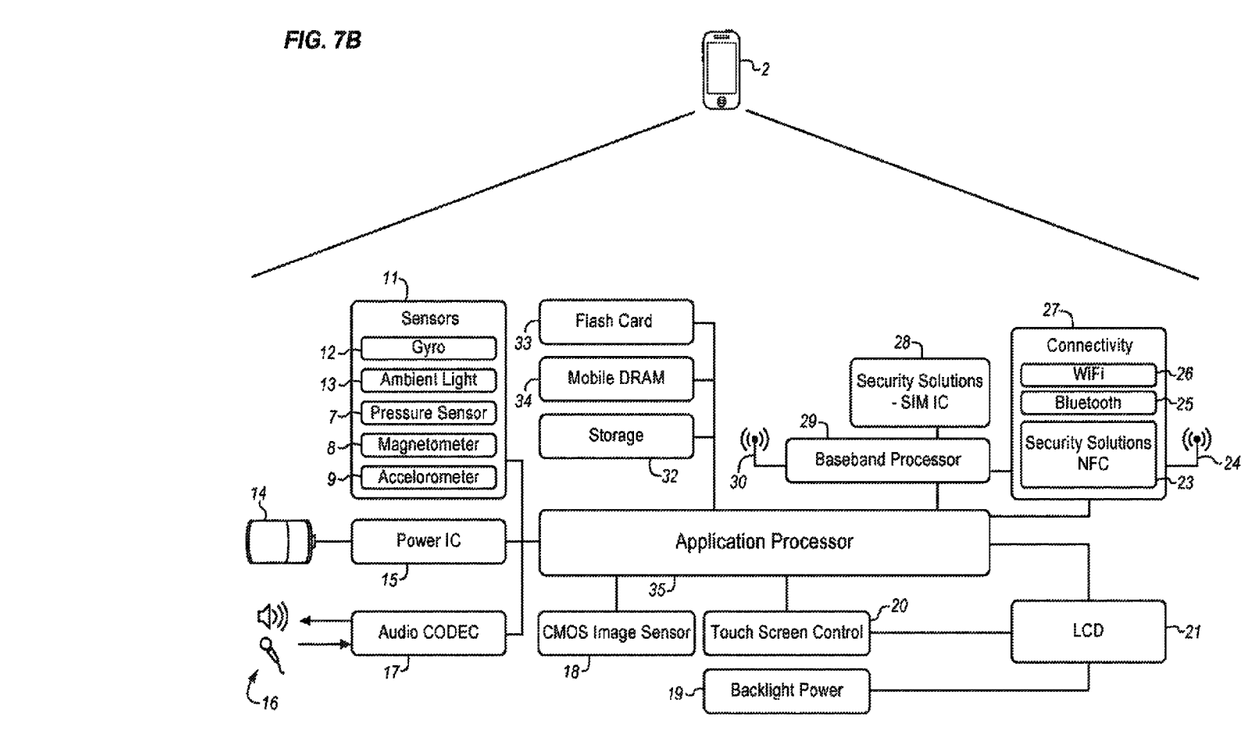
FIG. 7b shows an example of a smart phone that may be used in conjunction with embodiments of systems and methods for Revisit Location Detection.

FIGS. 7a and 7b show an example of an environment in which embodiments of systems and methods for Revisit Location Detection may be implemented. In many implementations, a user may move around an area with a computer 1, smart phone 2, or other computing device.

Sensors in the computer 1, smart phone 2, or other computing device may collect data from the environment as well as radio signals from access points 10. Embodiments of systems and methods for Revisit Location Detection may be designed to function with off the shelf computing devices such as smart phones. An exemplary smart phone 2 is shown in FIG. 7b. The lines connecting modules or parts of the smart phone indicate one or two way communication: however, the pieces may be configured and may communicate differently in alternatives. The smart phone may include sensors 11 that communicate with the application processor 35. Sensors may include a gyroscopic sensor 12, an ambient light sensor 13, a pressure sensor (for detecting atmospheric pressure), a magnetometer and accelerometer 9. The smart phone 2 may further include battery 14 and power management integrated circuit 15. The smart phone 2 may further include a speaker and microphone 16 and an audio codec 17 for encoding audio. The smart phone 2 may further include a CMOS image sensor 18 that may find use in a camera. The smart phone 2 may further include a touch screen control 20 that is configured to interact with a LCD 21 that may have a backlight power module 19. The smart phone 2 may further include wireless radio modules includes connectivity modules 27. Connectivity modules 27 include modules for WiFi 26, Bluetooth 25, and Near Field Communication (including security solutions) 23. These systems may use common antenna 24, however in alternatives, different antennas may be utilized. Smart phone 2 may also include SIM, card security systems 28 and a baseband processor 29 that communicates with antenna 30 for communicating via typical mobile phone frequencies, such as CDMA, 3GPP, 4GPP, etc. Smart phone 2 may also include memory systems such a flash card 33, mobile DRAM 34, and other types of storage 32. All of these systems may communicate with application processor 35 in order to implement the systems and methods for Revisit Location Detection as well as other typical smart phone activities. A custom device may be created that eliminates some of these components, such as Bluetooth module 25. NFC modules 23, CMOS image sensor 18, microphone and speaker 16 and associated audio CODEC 17, as well as other parts of the system. However, the system may be implemented in off the shelf systems.

Although the systems and methods described herein are shown, in relation to WiFi signals, other types of radio frequency signals may be used. WiFi signals may have some advantages due to the high degree of granularity over short distances as compared to other types of commonly used RF signals, such as various mobile phone communications. Additionally, other types of signals such as ToF (Time of Flight) or PDP (Power Delay Profile) can be used in identifying the revisit point as well.

Various embodiments of systems and methods for Revisit Location Detection may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as, but not limited to, source code, compiled code interpreted code, executable code, static code, dynamic code, and the like. Such a computer-readable medium may include any tangible non-transitory medium for storing information in a form readable by one or more computers, such as but not limited to, read only memory (ROM); random access memory (RAM); magnetic disk storage media; optical storage media; a flash memory, etc.

Embodiments of systems and methods for Revisit Location Detection described herein may be implemented in a variety of systems, including, but not limited to, smartphones, tablets, laptops. Ultrabooks™, and combinations of computing devices and cloud computing resources. For instance, portions of the operations may occur in one device, and other operations may occur at a remote location, such as a remote server or servers. For instance, the collection of the data may occur at a smartphone and the data analysis may occur at a server or in a cloud computing resource. Any single computing device or combination of computing devices may execute the methods described.

In one embodiment, a method of detecting a revisit position includes receiving at a computing system a plurality of position data points, each of the plurality of position data points including a signal scan measurement. The method further includes calculating a first signal distance between a first signal scan measurement corresponding to a first position data point of the plurality of position data points and a second signal scan measurement corresponding to a second position data point of the plurality of position data points. The method further includes determining that the first signal distance is less than a first threshold, that the first signal distance is a local minimum for the first position data point, and that the first signal distance is a local minimum for the second position data point. The method further includes, based on the determining identifying the first and second position data points as revisit points. Optionally, the determining further includes determining that the elapsed time between the first position data point and the second position data point is above a second threshold. Alternatively, the plurality of position points is generated by a portable electronic device traversing a path. In one alterative, the path is traversed more than once. Optionally, the signal scan measurement is a WiFi scan measurement. Alternatively, the local minimum for the first position data point is calculated by determining that the first signal distance is less than a plurality of second signal distances between the first position data point and position data points adjacent to the second position data point. Optionally, the local minimum for the second position data point is calculated by determining that the first signal distance is less than a plurality of second signal distances between the second position data point and position data points adjacent to the first position signal data point. In one configuration, the first signal distance is a normalized distance. Optionally, the first and second signal scan measurements are a RSSI vector. Alternatively, the computing system is selected from a group consisting of a portable electronic device, a remote server, and a cloud computing system.

In one embodiment, a system for detecting a revisit position includes a computing system configured to receive a plurality of position data points, each of the plurality of position data points including a signal scan measurement. The computing system is con figured to calculate a first signal distance between a first signal scan measurement corresponding to a first position data point of the plurality of position data points and a second signal scan measurement corresponding to a second position data point of the plurality of position data points. The computing system is configured to determine that the first signal distance is less than a first threshold, that the first signal distance is a local minimum for the first position data point, and that the first signal distance is a local minimum for the second position data point. The computing system is configured to, based on the determining, identify the first and second position data points as revisit points. In one configuration, the computing system determines that the elapsed time between the first position data point and the second position data point is above a second threshold. Optionally, the plurality of position points are generated by a portable electronic device traversing a path. Alternatively, the path is traversed more than once. In one alternative, the signal scan measurement is WiFi scan measurement. In another alternative, the local minimum for the first position data point is calculated by determining that the first signal distance is less than a plurality of second signal distances between the first position data point and position data points adjacent to the second position data point. Optionally, the local minimum for the second position data point is calculated by determining that the first signal distance is less than a plurality of second signal distances between the second position data point and position data points adjacent to the first position signal data point. Alternatively, the first signal distance is a normalized distance. In another alternative, the first and second signal scan measurements are a RSSI vector. Optionally, the computing system is selected from a group consisting of a portable electronic device, a remote server, and a cloud computing system. In one configuration, the computing system includes a WiFi module that is configured to create the signal scan measurement for each of the plurality of position data points. In another configuration, the computing system includes a WiFi module that receives signal strength indications and the computing system includes an application processor that receives the signal strength indications and create the signal scan measurement for each of the plurality of position data points from the signal strength indications.

In another embodiment, a method of detecting a revisit position and realigning path data includes receiving at a computing system a plurality of position data points, each of the plurality of position data points including a signal scan measurement, the plurality of position data points representative of more than one traversal of a path travelled by a portable electronic device. The method further includes calculating a first signal distance between a first signal scan measurement corresponding to a first position data point of the plurality of position data points and a second signal scan measurement corresponding to a second position data point of the plurality of position data points. The method further includes determining that the first signal distance is less than a first threshold, that the first signal distance is a local minimum for the first position data point, and that the first signal distance is a local minimum for the second position data point. The method further includes, based on the determining, identifying the first and second position data points as revisit points. The method further includes realigning the second position data point as being collocated with the first position data point and optimizing the entire trajectory. The method further includes optimizing a trajectory based on the realigning, between the second position data point and the first position data point. In one embodiment, the trajectory optimization uses simultaneous location and mapping. Optionally, the plurality of position data points include dead reckoning position information.

In one embodiment, a computer-readable non-transitory storage medium contains instructions which, when executed by one or more processors, result in performing operations including receiving at a computing system a plurality of position data points, each of the plurality of position data points including a signal scan measurement. The operations further include calculating, at the computing system, a first signal distance between a first signal scan measurement corresponding to a first position data point of the plurality of position data points and a second signal scan measurement corresponding to a second position data point of the plurality of position data points. The operations further include determining, at the computing system, that the first signal distance is less than a first threshold, that the first signal distance is a local minimum for the first position data point, and that the first signal distance is a local minimum for the second position data point. The operations further include, based on the determining, identifying, at the computing system, the first and second position data points as revisit points. Optionally, the determining further includes determining that the elapsed time between the first position data point and the second position data point is above a second threshold. Alternatively, the plurality of position points are generated by a portable electronic device traversing a path. Optionally, the path is traversed more than once. Alternatively, the signal scan measurement is a WiFi scan measurement. Optionally, the local minimum for the first position data point is calculated by determining that the first signal distance is less than a plurality of second signal distances between the first position data point, and position data points adjacent to the second position data point. In one configuration, the local minimum for the second position data point is calculated by determining that the first signal distance is less than a plurality of second signal distances between the second position data point and position data points adjacent to the first position signal data point. Optionally, the first signal distance is a normalized distance. Alternatively, the first and second signal scan measurements are a RSSI vector. Optionally, the computing system is selected from a group consisting of a portable electronic device, a remote server, and a cloud computing system.

The previous detailed description is of a small number of embodiments for implementing the systems and methods for Revisit Location Detection and is not intended to be limiting in scope. The following claims set forth a number of the embodiments of the systems and methods for Revisit Location Detection disclosed With greater particularity.

The invention claimed is:

1. A method of detecting a revisit position, the method comprising:
   receiving at a computing system a plurality of position data points, each of the plurality of position data points including a signal scan measurement;
   calculating, at the computing system, a first signal distance between a first signal scan measurement corresponding to a first position data point of the plurality of position data points and a second signal scan measurement corresponding to a second position data point of the plurality of position data points;
   determining, at the computing system, that the first signal distance is less than a first threshold, that the first signal distance is a local minimum for the first position data point, and that the first signal distance is a local minimum for the second position data point; and
   based on the determining, identifying, at the computing system, the first and second position data points as revisit points.

2. The method of claim 1, wherein the determining further includes determining that the elapsed time between the first position data point and the second position data point is above a second threshold.

3. The method of claim 2, wherein the plurality of position points are generated by a portable electronic device traversing a path.

4. The method of claim 3, wherein the path is traversed more than once.

5. The method of claim 1, wherein the signal scan measurement is a WiFi scan measurement.

6. The method of claim 1, wherein the local minimum for the first position data point is calculated by determining that the first signal distance is less than a plurality of second signal distances between the first position data point and position data points adjacent to the second position data point.

7. The method of claim 1, wherein the local minimum for the second position data point is calculated by determining that the first signal distance is less than a plurality of second signal distances between the second position data point and position data points adjacent to the first position signal data point.

8. The method of claim 1, wherein the first signal distance is a normalized distance.

9. The method of claim 8, wherein the first and second signal scan measurements are a RSSI vector.

10. The method of claim 1, wherein the computing system is selected from a group consisting of a portable electronic device, a remote server, and a cloud computing system.

11. A system for detecting a revisit position, the system comprising:
a computing system configured to receive a plurality of position data points, each of the plurality of position data points including a signal scan measurement;
calculate a first signal distance between a first signal scan measurement corresponding to a first position data point of the plurality of position data points and a second signal scan measurement corresponding to a second position data point of the plurality of position data points;
determine that the first signal distance is less than a first threshold, that the first signal distance is a local minimum for the first position data point, and that the first signal distance is a local minimum for the second position data point; and
based on the determining, identify the first and second position data points as revisit points.

12. The system of claim 11, wherein the computing system determines that the elapsed time between the first position data point and the second position data point is above a second threshold.

13. The system of claim 12, wherein the plurality of position points are generated by a portable electronic device traversing a path.

14. The system of claim 13, wherein the path is traversed more than once.

15. The system of claim 11, wherein the signal scan measurement is a WiFi scan measurement.

16. The system of claim 11, wherein the local minimum for the first position data point is calculated by determining that the first signal distance is less than a plurality of second signal distances between the first position data point and position data points adjacent to the second position data point.

17. The system of claim 11, wherein the local minimum for the second position data point is calculated by determining that the first signal distance is less than a plurality of second signal distances between the second position data point and position data points adjacent to the first position signal data point.

18. The system of claim 11, wherein the computing system includes a WiFi module that is configured to create the signal scan measurement for each of the plurality of position data points.

19. The system of claim 11, wherein the computing system includes a WiFi module that receives signal strength indications and the computing system includes an application processor that receives the signal strength indications and create the signal scan measurement for each of the plurality of position data points from the signal strength indications.

20. A computer-readable non-transitory storage medium that contains instructions, which, when executed by one or more processors, result in performing operations comprising:
receiving at a computing system a plurality of position data points, each of the plurality of position data points including a signal scan measurement;
calculating, at the computing system, a first signal distance between a first signal scan measurement corresponding to a first position data point of the plurality of position data points and a second signal scan measurement corresponding to a second position data point of the plurality of position data points;
determining, at the computing system, that the first signal distance is less than a first threshold, that the first signal distance is a local minimum for the first position data point, and that the first signal distance is a local minimum for the second position data point; and
based on the determining, identifying, at the computing system, the first and second position data points as revisit points.

21. The medium of claim 20, wherein the determining further includes determining that the elapsed time between the first position data point and the second position data point is above a second threshold.

22. The medium of claim 21, wherein the plurality of position points are generated by a portable electronic device traversing a path.

23. The medium of claim 22, wherein the path is traversed more than once.

24. The medium of claim 20, wherein the signal scan measurement is a WiFi scan measurement.

25. The medium of claim 20, wherein the local minimum for the first position data point is calculated by determining that the first signal distance is less than a plurality of second signal distances between the first position data point and position data points adjacent to the second position data point.

\* \* \* \* \*